Inventor
Percy H. Davies
By
Attorney

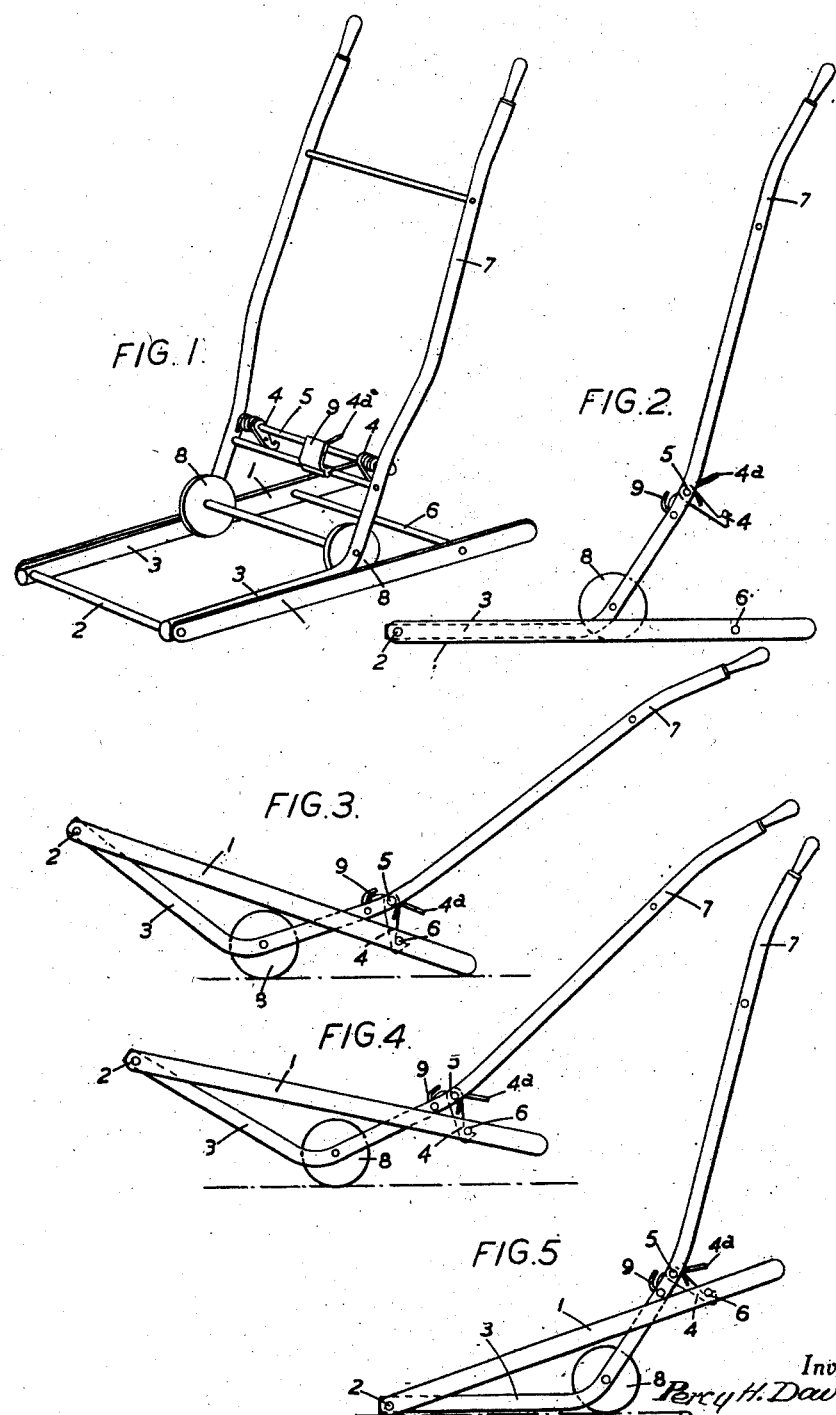

UNITED STATES PATENT OFFICE 2,374,982

HAND TRUCK

Percy Hamilton Davies, Dudley, England

Application March 17, 1943, Serial No. 479,514
In Great Britain April 28, 1942

12 Claims. (Cl. 214—65)

This invention relates to hand trucks which may be either two-wheeled or four-wheeled for the transport of open trays, boxes or other containers holding loose pieces or for the conveyance of other goods and has for its object to render the truck automatic in operation to facilitate loading and unloading and to balance the load during transport, while at the same time to so dispose the load that spilling of loose pieces is avoided.

According to this invention, a hand truck comprises a main frame including a front base platform and a supplementary return platform pivoted thereto and astride or collaterally disposed of same, said supplementary platform being initially adapted to co-act at ground level or the horizontal co-planar with the base platform for loading, and upon swinging back the truck adapted to cant relatively to the main frame into a rearwardly declivitous ramp to lift and locate the load.

Also according to the invention, the supplementary return platform pivoted to the base platform is adapted to become locked to the main frame so that it is movable en bloc therewith for transport and by tipping the truck to cant into a forwardly inclined ramp for unloading.

The invention is described with reference to the accompanying drawings in which—

Figure 1 is a perspective view of a two-wheeled hand truck in the loading position.

Figure 2 is a side elevation also in the loading position.

Figure 3 is a side elevation in the lifting position.

Figure 4 is a similar view in the travelling position.

Figure 5 is a like view in the unloading position.

Figure 6:
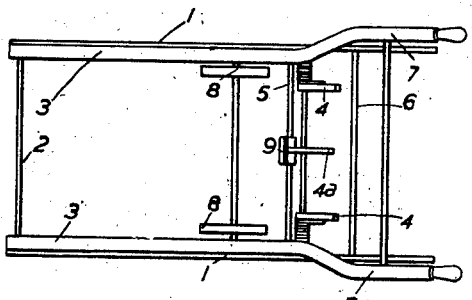
Figure 6 is a plan.

In a convenient embodiment of the invention as shown in Figures 1 to 6, the truck is a two-wheeled vehicle provided with a supplementary return platform 1 composed of two conjoint side arms pivoted at the forward cross pin 2 to a base platform 3 forming part of the main frame of the truck, said side arms being located at opposite sides without the main frame, but they may be situated within the latter, as desired. The side arms are normally free at the rear end where they rest upon the ground as in the lifting position shown in Figure 3. Hook-like catches 4 pivoted on the cross stay 5 connecting the side members of the truck frame are adapted to engage the cross stay 6 bracing the side arms when backwardly canting the truck by depressing the truck handle shafts or members 7, the truck being pivoted upon the axle of the ground wheels 8 situated on the inner sides of the truck frame upon which is a fixed stop 9 for checking the slide of the load. A release lever 4a mounted on the cross stay 5 is pressed by hand or foot for disengaging the catches 4 from the cross stay 6 of the supplementary platform.

To load, the handle shafts or members 7 are pressed forwards, causing the truck to swing on its axis so that the supplementary platform 1 and base platform 3 are horizontally co-planar at ground level as shown in Figures 1 and 2. In this position, both platforms are then jointly passed under the load for loading purposes and by slightly depressing the handle shafts or members 7, the supplementary platform 1 is canted from its pivotal point so that it assumes a backward declination from the cross pin 2 astride or collateral with the base platform 3 as shown in Figure 3 and now acting alone replaces the base platform as a slide for the load which has then been lifted and will move towards the central part of the truck and more or less above the ground wheels 8, said load then being arrested by the stop 9. At this stage of the operations, the side members of the base platform 3 act as struts which prop up the supplementary platform 1, the arms of which rest endwise rearwardly against the ground. The loaded truck is now balanced and by a further slight depression of the handle shafts or members 7 to backwardly swing the truck, the catches 4 engage the cross stay 6 underlying the main frame and lock the supplementary platform 1 to the truck frame as shown in Figure 3. The supplementary platform 1 and the truck proper are now unitary and act en bloc and by slightly lifting the truck by the handle shafts or members 7, the supplementary platform 1 is raised to a slightly inclined position bringing its rear part clear of the ground for transport as indicated in Figure 4. By further raising the handle shafts or members 7, the base platform 3 is lowered horizontally to the ground as shown in Figure 5 but the supplementary platform 1 being still locked to the truck frame is set in angular relation to the said base platform so as to present a forward declinatory ramp which causes the load to slide to the ground for unloading purposes, whence the truck and associated supplementary platform 1 can be withdrawn from the load. The operator may then release the catches 4 from the cross stay 6 by pressing the release lever 4a whereupon the supplementary platform 1 drops to the lowered position co-planar with the base platform 3 in readiness for loading again.

It will be obvious that the supplementary platform may embody a floor plate covering the space between the side arms and shaped to clear the ground wheels.

Figure 7:
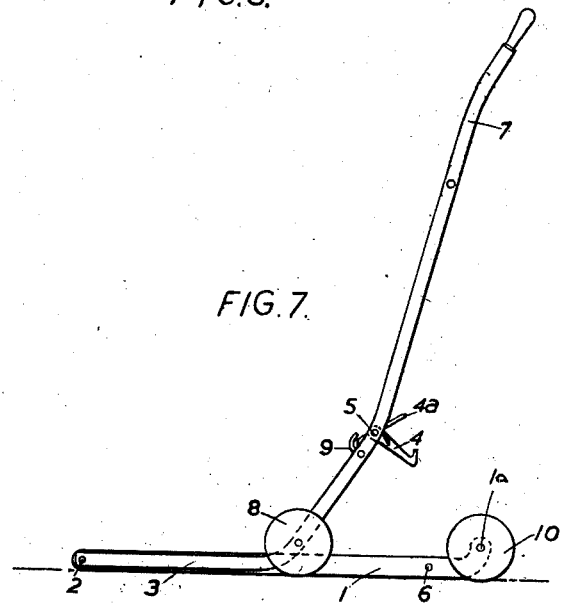
Figure 7 is a modification.
Figure 8:
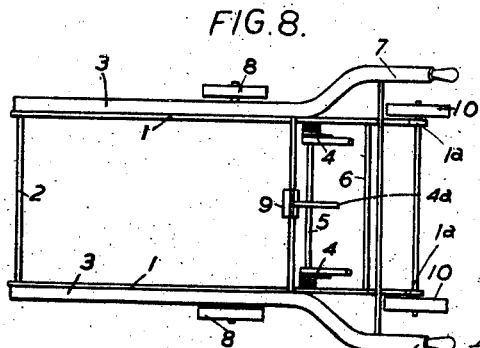
Figure 8 is a plan thereof.

In the modification shown in Figures 7 and 8, the supplementary platform 1 has at its rear end anti-friction ground wheels 10 mounted in upturned ends 1a which allow the supplementary platform to lie in a co-planar position with the base platform 3 for loading as indicated in Figure 7. Incidentally, with these additional wheels, the truck becomes a four-wheeled vehicle. It will be noted that the supplementary platform is located within the truck frame and the ground wheels 8 are on stub axles outside the latter, but alternatively, the supplementary platform may be placed outside the main frame and the ground wheels on the inside of the latter as in the aforesaid construction. In other respects, the parts are as heretofore described and designated accordingly.

The catches may be of any other suitable form and mounted on the supplementary platform to engage the truck frame.

What I claim is:

1. A hand truck comprising a main frame having an advanced base platform and a supplementary return platform in the form of a pair of spaced side arms pivoted at their forward part to the front end of the base platform and located collaterally within or without the main frame, a cross stay bracing the side arms and underlying the main frame and catches pivoted upon a cross stay connecting the side members of the main frame, wherein said catches are adapted to engage the cross stay bracing the side arms whereby said side arms are locked to the main frame and are unitary therewith such that the main frame and supplementary platform operate en bloc.

2. A hand truck comprising a main frame embodying a front base platform and rearwardly extending handle shafts or members, said main frame being pivoted upon the axle of ground wheels situated at a mid position, a supplementary platform pivoted at its forward part to the front end of the base platform and extending backward from the articulation so as to lie side by side or astride of the main frame, said supplementary platform in lifting the load being raised at its pivoted joint and assuming a rearwardly declivitous ramp for positioning the load.

3. A hand truck comprising a main frame having a front base platform and rear handle members pivotally mounted intermediately upon the axle of a pair of ground wheels, a supplementary return platform pivoted at its fore part to the base platform and lying astride or collateral of the latter, anti-friction ground wheels upon the rear part of the supplementary platform and locking means to lock the supplementary platform to the main frame of the truck whereby the said supplementary platform becomes a unitary member with the main frame and is movable en bloc therewith.

4. A hand truck comprising a main frame having a pair of handle shafts or members from which extends an advanced base platform pivotally mounted on the axle of a pair of centrally disposed ground wheels, a supplementary return platform pivotally mounted at its front end upon the forward part of the base platform and having its rear part normally free, said supplementary platform being disposed beside or astride the base platform and as the truck is partly tipped backward adapted to assume a rearwardly declivitous ramp, with the base platform serving as a strut for the same.

5. A hand truck comprising a main frame having a pair of rear handle shafts or members extending to a front base platform pivotally mounted on the axle of ground wheels, a supplementary platform pivoted forwardly to the base platform and extending backwards astride or collateral of the latter to free ends, pivoted catches acting between the main frame and the supplementary platform to lock the latter to the said main frame upon depression of the handle shafts or members whereby the whole structure moves en bloc for transport and unloading.

6. A hand truck comprising a main frame having rear handle members and a front base platform pivotally mounted on intermediate ground wheels, a supplementary return platform forwardly pivoted to the base platform with its rear part normally free, locking means interposed between the main frame and the supplementary platform brought into action as the truck is partly tipped backward whereby the supplementary platform is made unitary with the main frame, and a stop on the main frame to limit the slide of the load upon the supplementary platform.

7. A hand truck comprising a frame including a base platform, a supplementary platform pivoted at the front end to the advance end of the base platform while being free at the remote end and adapted to lie coplanar with the base platform when the truck is in loading position, said supplementary platform moving automatically to a locked position with respect to the base platform when the truck is tilted from loading position toward transport position.

8. A hand truck comprising a frame including a base platform, a supplementary platform pivotally connected at its front end to the base platform near the front end of the latter, the supplementary and base platforms being coplanar when the truck is in loading position, the rear end of the supplementary platform contacting with the truck supporting surface to compel an inclined position of the supplementary platform with respect to the base platform in the tilting of the truck.

9. A hand truck comprising a frame including a base platform, a supplementary platform pivotally connected to the base platform near the forward end of the latter, the rear end of the supplementary platform contacting with the truck supporting surface to compel an inclined position of the supplementary platform in the tilting of the truck, the inclined position of the supplementary platform being rearwardly and upwardly relative to the forward end of the base platform to utilize such supplementary platform for load discharge function.

10. A construction as defined in claim 7 wherein the end of the supplementary platform remote from its pivotal mounting is free of connection with the truck and provided with ground engaging wheel support.

11. A construction as defined in claim 7 wherein means are provided to lock the supplementary platform at a predetermined inclination with respect to the base platform when the truck is tilted from loading into transport position.

12. A hand truck having a wheel support and a fixed base platform, a supplementary platform movably connected to the base platform near the forward end of the latter, the base platform and supplementary platform being coplanar when the truck is in load-receiving position, the rear end of the supplementary platform having wheel support on the truck-supporting surface, said supplementary platform being tilted on its wheel support as a fulcrum relative to the base platform when the truck is tilted on its wheel support to carry the load, the wheel support of the supplementary platform remaining in contact with the truck-supporting surface during transportation.

PERCY H. DAVIES.